United States Patent
Silverbrook et al.

(10) Patent No.: US 7,292,363 B2
(45) Date of Patent: *Nov. 6, 2007

(54) METHOD OF CONFIGURING A PRINTER FOR VACATION PERIODS

(75) Inventors: Kia Silverbrook, Balmain (AU); Paul Lapstun, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 11/148,238

(22) Filed: Jun. 9, 2005

(65) Prior Publication Data

US 2005/0219615 A1    Oct. 6, 2005

Related U.S. Application Data

(63) Continuation of application No. 09/722,148, filed on Nov. 25, 2000, now Pat. No. 7,064,851.

(30) Foreign Application Priority Data

Dec. 1, 1999    (AU) .................................. PQ4392

(51) Int. Cl.
  *G06F 15/00* (2006.01)
  *G06K 1/00* (2006.01)
(52) U.S. Cl. ..................... 358/1.15; 358/1.16
(58) Field of Classification Search ............. 358/1.15, 358/296, 1.16
See application file for complete search history.

(56) References Cited

U.S. PATENT DOCUMENTS

| | | | |
|---|---|---|---|
| 4,864,618 A | 9/1989 | Wright et al. | |
| 4,947,345 A | 8/1990 | Paradise et al. | |
| 5,051,736 A | 9/1991 | Bennett et al. | |
| 5,146,344 A | * 9/1992 | Bennett et al. | 358/296 |
| 5,477,012 A | 12/1995 | Sekendur | |
| 5,652,412 A | 7/1997 | Lazzouni et al. | |
| 5,661,506 A | 8/1997 | Lazzouni et al. | |
| 5,692,073 A | 11/1997 | Cass | |
| 5,852,434 A | 12/1998 | Sekendur | |
| 5,935,262 A | 8/1999 | Barrett et al. | |

(Continued)

FOREIGN PATENT DOCUMENTS

EP    0944239 A1    9/1999

OTHER PUBLICATIONS

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

*Primary Examiner*—David Moore
*Assistant Examiner*—Satwant Singh

(57) ABSTRACT

A method of configuring a printer for vacation periods is provided. The printer is connected to a network server and the method comprises switching the printer between a first operative mode, in which the network server transmits print data to the printer and the printer prints documents, and a second operative mode, in which the printer does not print documents and the network server stores data relating to pending print jobs which have not been printed. When the mode changes from the second mode to the first mode the network server retrieves or generates an electronic summary of the pending print jobs and causes the printer to print a printed summary corresponding to the electronic summary.

7 Claims, 1 Drawing Sheet

U.S. PATENT DOCUMENTS

| | | |
|---|---|---|
| 6,076,734 A | 6/2000 | Dougherty et al. |
| 6,160,629 A | 12/2000 | Tang et al. |
| 6,288,790 B1 * | 9/2001 | Yellepeddy et al. ....... 358/1.15 |
| 6,313,921 B1 * | 11/2001 | Kadowaki .................. 358/1.15 |
| 6,654,137 B1 | 11/2003 | Yagita |
| 6,687,018 B1 | 2/2004 | Leong et al. |
| 6,704,431 B1 | 3/2004 | Ogawa et al. |
| 6,964,374 B1 | 11/2005 | Djuknic et al. |
| 7,064,851 B1 * | 6/2006 | Silverbrook et al. ....... 358/1.15 |
| 7,151,613 B1 * | 12/2006 | Ito .............................. 358/1.15 |

* cited by examiner

METHOD OF CONFIGURING A PRINTER FOR VACATION PERIODS

CROSS REFERENCE TO RELATED APPLICATIONS

The present application is a continuation of U.S. application Ser. No. 09/722,148 filed on Nov. 25, 2000 now U.S. Pat. No. 7,064,851, the entire contents of which are herein incorporated by reference.

TECHNICAL FIELD

This invention relates to semi-automatic provision of data and documents to users. More particularly it relates to printers capable of being switched to a "vacation"mode.

CO-PENDING APPLICATIONS

Various methods, systems and apparatus relating to the present invention are disclosed in the following co-pending applications/granted patents filed by the applicant or assignee of the present invention on Nov. 25, 2000:
Ser. Nos. 09/721,895, 09/721,8944, 09/722,174, 09/721,896, 09/722,148, 09/722,146, 09/721,861, U.S. Pat. No. 6,741,871, Ser. Nos. 09/722,171, 09/721,858, 09/722,142, 09/722,087, 09/722,141, 09/722,175, 09/722,147, 09/722,172, 09/721,893, 09/722,088, 09/721,862, U.S. Pat. Nos. 6,530,339, 6,631,897

The disclosures of these co-pending applications are incorporated herein by cross-reference.

Various methods, systems and apparatus relating to the present invention are disclosed in the following co-pending applications/granted patents filed by the applicant or assignee of the present invention on Oct. 20, 2000:
Ser. Nos. 09/693,415, 09/693,219, 09/693,280, 09/693,515, 09/693,705, 09/693,647, 09/693,690, 09/693,593, U.S. Pat. Nos. 6,474,888, 6,627,870, 6,724,374, Ser. Nos. 09/696,514, 09/693,301, U.S. Pat. No. 6,454,482, Ser. No. 09/693,704, U.S. Pat. Nos. 6,527,365, 6,474,773, 6,550,997

The disclosures of these co-pending applications are incorporated herein by cross-reference.

Various methods, systems and apparatus relating to the present invention are disclosed in the following co-pending applications/granted patents filed by the applicant or assignee of the present invention on Sep. 15, 2000:
U.S. Pat. No. 6,679,420, Ser. Nos. 09/669,599, 09/663,701, U.S. Pat. No. 6,720,985

The disclosures of these co-pending applications are incorporated herein by cross-reference.

Various methods, systems and apparatus relating to the present invention are disclosed in the following co-pending applications/granted patents filed by the applicant or assignee of the present invention on Jun. 30, 2000:
Ser. Nos. 09/609,139, 09/608,970, U.S. Pat. No. 6,678,499, Ser. Nos. 09/607,852, 09/607,656, U.S. Pat. No. 6,766,942, Ser. Nos. 09/609,303, 09/610,095, 09/609,596, 09/607,843, 09/607,605, 09/608,178, 09/609,553, 09/609,233, 09/609,149, 09/608,022, 09/607,844, U.S. Pat. No. 6,457,883, Ser. Nos. 09/608,920, 09/607,985, U.S. Pat. Nos. 6,398,332, 6,394,573, 6,622,923

The disclosures of these co-pending applications are incorporated herein by cross-reference.

Various methods, systems and apparatus relating to the present invention are disclosed in the following co-pending applications/granted patents filed by the applicant or assignee of the present invention on May 23, 2000:
Ser. Nos. 09/575,197, 09/575,195, 09/575,159, 09/575,132, 09/575,123, 09/575,148, 09/575,130, 09/575,165, 09/575,153, 09/575,118, 09/575,131, 09/575,116, 09/575,144, 09/575,139, 09/575,186, U.S. Pat. Nos. 6,681,045, 6,728,000, Ser. Nos. 09/575,145, 09/575,192, 09/575,181, 09/575,193, 09/575,183, 09/575,160, 09/575,150, 09/575,169, U.S. Pat. Nos. 6,644,642, 6,502,614, 6,622,999, 6,669,385, 6,549,935, Ser. No. 09/575,187, U.S. Pat. Nos. 6,727,996, 6,591,884, 6,439,706, 6,760,119, 9/575,198, 6,290,349, 6,428,155, 6,785,016, Ser. No. 09/575,174, 09/575,163, U.S. Pat. No. 6,737,591, Ser. No. 09/575,154, 09/575,129, 09/575,124, 09/575,188, 09/575,189, 09/575,162, 09/575,172, 09/575,170, 09/575,171, 09/575,161, U.S. Pat. No. 6,428,133, 6,526,658, 6,315,399, 6,338,548, 6,540,319, 6,328,431, 6,328,425, Ser. No. 09/575,127, U.S. Pat. Nos. 6,383,833, 6,464,332, 6,390,591, Ser. No. 09/575,152, U.S. Pat. Nos. 6,328,417, 6,409,323, 6,281,912, 6,604,810, 6,318,920, 6,488,422, Ser. Nos. 09/575,108, 09/575,109, 09/575,110

The disclosures of these co-pending applications are incorporated herein by cross-reference.

BACKGROUND ART

Current on-demand printers, such as laser printers, generally have two effective modes, on and off. When turned on, a printer will, generally, accept and print any print job sent to it. When turned off, the printer neither accepts nor prints any print job. We have proposed in our co-pending application U.S. Ser. No. 09/722,142, the contents of which is incorporated herein by reference, a system in which a printer is permanently connected to a network. The user of the printer subscribes to publications, such as newspapers and the network sends print jobs to the printer in fulfillment of the user's subscriptions.

DISCLOSURE OF THE INVENTION

In one broad form the invention provides printing system including a printer for printing documents based at least in part on print data and a server for receiving and/or generating print jobs and for transmitting print data to the printer corresponding to the print jobs, the system having a first operative mode in which the server transmits print data to the printer and the printer prints documents and a second operative mode, in which the printer does not print documents and the system stores data relating to pending print job which has not been printed and when the mode changes from the second mode to the first mode the system retrieves or generates an electronic summary of the pending print jobs and causes the printer to print a printed summary corresponding to the electronic summary.

The system preferably includes selection mechanisms to enable the user to either delete or print each document. In the preferred form the printer is a netpage printer and each page of the summary is printed with tags to enable interaction with the paper directly by way of a netpage pen. The paper may be pre-printed with tags or the printer may print the tags with the document summary information.

If netpage tags are provided on the printed summary the user may use a netpage pen or similar sensor to select printing or deletion of each document by selecting an appropriate area on the page(s). The summary may have a "print all" and a "delete all"options on each page, only the last or only the first page of the summary.

If the pages are not netpage enabled the documents are preferably identified by a separate code or codeword to enable the user to make similar selections via an alternate user interface. The interface may be the control panel of the printer.

After each document is printed, it is preferably deleted from the electronic summary.

If the user neither deletes nor prints a document it remains on the electronic summary. The system may delete the electronic summary after a preset period of time, such as a week. This period may be set by the system administrator or by the user, or both may be able to set a period, the user sets the period being no longer than the administrator-set period. Administrator set periods may be set globally, for groups or classes of users and/or on an individual basis.

In the preferred form, a summary of documents is only printed when the printer has been in a specific "vacation" mode. The system may be set up so that it also prints a summary when the printer has been off-line or off for more than certain periods. The system may automatically print documents less than a certain age or may print a summary for all documents which have not been printed. This may be set by users for each printer or the system administrator may set it for classes of users or printers and/or an individual basis.

The system may override the user's "vacation" setting to ensure that important documents are printed, without the user being able to prevent their printing. Where the printer cannot be turned off, this may occur at any time or when the printer mode returns to the "normal" mode. If the printer can be turned off the system may print these documents as soon as the printer is turned on again.

The invention also has application to non-printing subscription services, such as an electronic subscription service in which a user subscribes to electronic publications rather than to printed publications. Accordingly, the invention also provides, in one broad form, a document delivery system including a server for receiving and/or generating documents and for transmitting said documents to a user, the system having a first operative mode in which the server transmits documents to the user and a second operative mode in which the server does not transmit documents to the user and the system stores data relating to any pending document which has not been transmitted to the user and, when the mode changes from the second mode to the first mode the system generates an electronic summary of the pending document or documents and transmits a user summary corresponding to the electronic summary to the user.

The document delivery system operates in a similar manner to the printing system and the features mentioned in relation to the printing system apply equally to the document delivery system.

BEST MODE OF CARRYING OUT THE INVENTION

Figure 1:
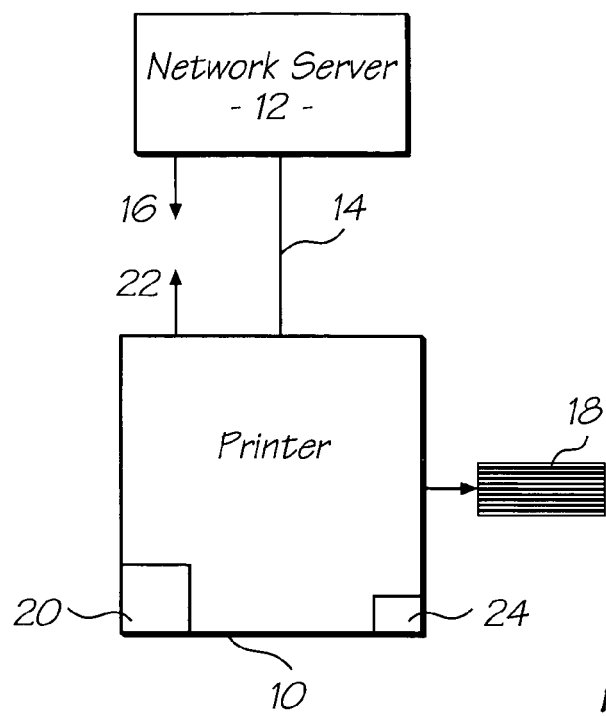
FIG. 1 is a schematic of a system utilizing the present invention.

The preferred embodiment of the invention is implemented in the netpage system as disclosed in our co-pending application U.S. Ser. No. 09/09/722,142 referred to earlier. In that system printers are connected to a network and users subscribe to publications such as newspapers and magazines. The publications are printed on the printers "automatically" with network servers initiating the printing process rather than the end user. The following description is of an embodiment of the invention as used in the netpage system and for a full explanation of the netpage system reference is made to the earlier application. A simplified explanation of the netpage system follows.

Referring to the drawings there is shown a netpage printer 10 connected to a server 12 via network 14. The server periodically generates print data 16 which is sent to the printer 10. On receipt of print jobs the printer prints documents 18 based at least partially on the print data 16. The printer is in two-way communication with the server via any appropriate method and protocol, e.g. LAN, WAN, Internet, radio, or mobile phone system. The printer includes a control panel 20 by which the some operations of the printer may be controlled. The printer includes at least a "normal" mode of operation and a "vacation" mode of operation. The printer may also have an "off"mode. These modes are selectable by the control panel. The "off" mode may be selected by a separate power switch 24 or by the control panel 20. The "vacation" mode and the "off" mode may be the same mode, or the "off" mode may imply the "vacation"mode In the "normal" mode, the printer 10 accepts print data 16 from the server and prints the print jobs as soon as possible after receipt of the print job or as set by the user or the server; the printer may be set to delay printing print jobs received during the night, for instance.

In the "off" mode the printer does not accept print data sent to it by the server 12 and so does not print anything.

The "vacation" mode is for use when the user of the printer is absent from the location for a significant period of time, such as when on vacation. As mentioned above, the user subscribes to publications and may not wish those publications to be printed whilst away. For example, generally, one does not read a two-week old newspaper so printing a newspaper whilst the user is away is wasteful.

Before the user leaves the location, the user uses the control panel 20 to switch the printer to "vacation" mode. Alternatively the printer may be turned "off", if this is an available option.

When placed in the "vacation" mode, the printer 10 transmits a "vacation" signal 22 to the server indicating that the printer is in "vacation" mode. The printer may send a "vacation" signal once on entry into the "vacation" mode or it may send the signal periodically. If the signal is sent once, preferably the server acknowledges receipt of the signal. If the printer does not receive acknowledgement preferably it resends the "vacation" signal at predetermined intervals until the server acknowledges. Preferably the "vacation" signal includes data relating to the time and date that the printer was placed in "vacation" mode. This is to enable the server to determine when the printer entered the "vacation" mode, since there may be a delay between entering the "vacation" mode and the server receiving advice of such. This is not essential as the server will keep track of documents which have not been printed. The printer may also turn off all functions relating to printing and optionally not accept print jobs from any source. In the preferred form of use, the printer is only provided with print data by the server and so it is not necessary to accommodate other sources of print jobs. Once acknowledgement from the server has been received, the printer may turn itself off totally. The server records that the printer is in "vacation" mode and does not send any print jobs to the printer. Instead the server records information identifying the documents which would have been printed if the printer were in the "normal" mode. This information may be the documents themselves or references to the documents.

When the user returns from vacation, the user changes the printer mode from "vacation" to "normal". This may be merely by turning the printer back on or by changing modes using the control panel. Preferably when the printer is turned on it defaults to the "normal" mode. When the printer enters the "normal" mode, either on power on or on changing from "vacation" mode, it sends a "normal mode" signal to the print server. Again the server preferably acknowledges receipt of the signal and preferably the printer will periodically send the signal until acknowledged. The printer preferably sends a "normal mode" signal whenever it enters the "normal" mode.

Figure 2:
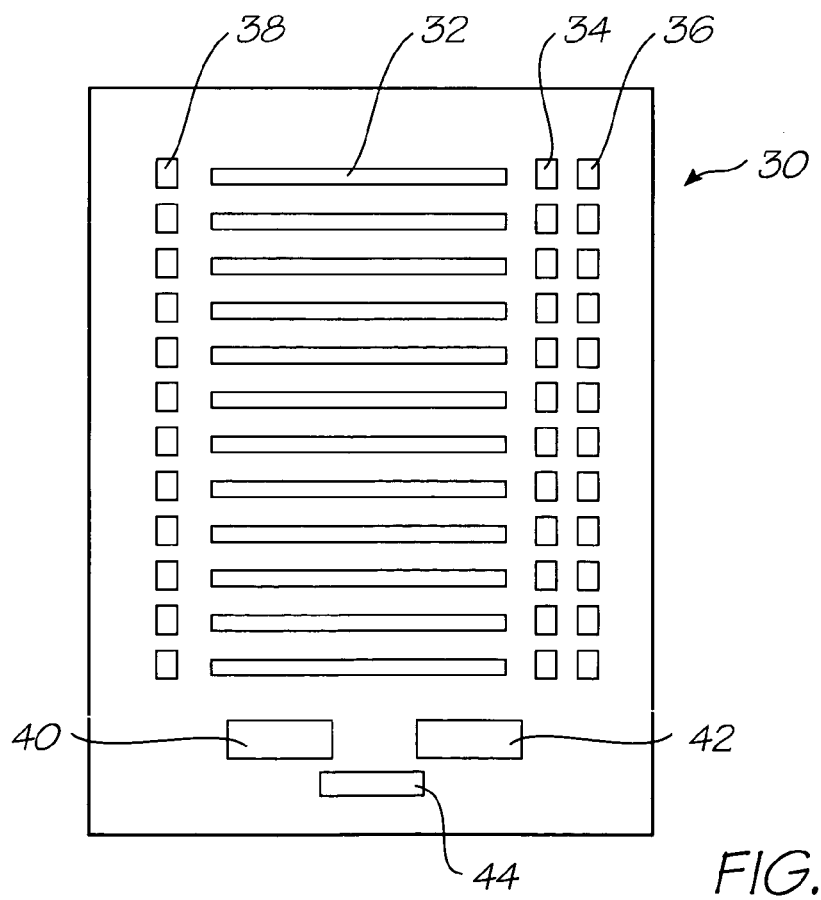
FIG. 2 shows a printed summary page.

When the server receives a "normal mode" signal, it determines if the printer has merely been turned on or if it has changed state from a "vacation" mode to a "normal"mode. If the server determines that the printer has been merely turned on, it sends print data relating to print jobs which should have been printed whilst the printer was off. However if the server determines that the printer state has changed from a "vacation"mode to a "normal" mode, it extracts information relating to all the "pending" documents which would have been printed whilst the printer was in "vacation" mode. The server then compiles a summary of the various documents and forwards this data to the printer to print a summary sheet 30 (see FIG. 2). The user may subscribe to a daily newspaper and a number of magazines, for example, and so the user may wish to print the magazines but not the newspapers and the summary enables the user to select what documents to print.

The summary sheet is printed by the printer and the user then peruses the summary. For each document on the summary there is provided the option of printing the document 34 or "deleting" the document 36. In this context, "deletion" means not printing the document and deleting the summary entry in the electronic summary, rather than deleting the actual document data itself since a document, such as a newspaper, may be printed for many users. The user may select one or none of the two options for each document of the summary. For those documents where "print" is selected, the server compiles the print job and sends appropriate print data to the printer for immediate printing. Once the document has been successfully printed, the server deletes the reference to the document for the list of "pending" documents. For "deleted"documents the server deletes the document for the list of pending documents without printing the document. If the user makes no selection the data in the summary relating to the document is unchanged.

In the preferred embodiment the printer is a netpage printer which prints netpages, as described our co-pending application U.S. Ser. No. 09/09/722,142. Netpages are printed with invisible tags which can be sensed by a netpage pen to provide interactive features of the netpage. Selection of an option may be by way of the netpage pen. As an alternative the summary may include an ID 38 for each document 32 on the summary. Options for each document may be entered into the system using the printer's control panel or another user interface. This is an option if the printer is not netpage enabled or a netpage pen is not available.

Preferably the summary sheet includes an option to print everything 40 and an option to delete everything 42. Printing or deletion of each document may occur as soon as one of the two options 34,36 is selected. Alternatively any selection(s) may only be activated on clicking on a send button 44 on the page. The print everything and delete everything options 40 and 42 may be printed on each page of the summary, only on the first page or only on the last page.

The server may maintain a list of pending documents for a predetermined period after a printer is changed from "vacation" mode to "normal" mode and at the end of the period any documents on the summary will be deleted. This may be a week or forever, for example. Any period may be chosen by the system administrator, such as a week or a month. If desired, the documents may never be deleted. The period may be the same for all users on the system or it may be capable of being set for each class of users or individual users. Each user may have the option of setting a period which is shorter, but typically never longer, than that set by the system administrator.

In an alternate embodiment, when the printer is in the "vacation" mode, it remains online and receives all print jobs sent by the server. The printer stores the print job information in its memory but does not print anything. On changing from "vacation" to "normal" mode, the printer prints a summary of the stored print jobs for the user to select from. Selected print jobs are printed and the information deleted from memory, deleted jobs are deleted from the printer memory and jobs which are neither printed nor deleted remain in the printer's memory for a selected period of time. It will be appreciated that where the printer receives and stores print jobs a non-volatile memory will be preferred for document storage. As an alternative, the printer may use its RAM memory to store print jobs.

In the preferred embodiment the system differentiates between the printer being in "normal" mode, turned off, off-line or in "vacation" mode and only prints a summary of pending documents if the printer was in "vacation" mode. It will be appreciated that the system may generate a summary when the printer changes from being off or off-line to being in "normal" mode as well as from being in "vacation" mode. The summary may be generated automatically or only if the printer has been off or off-line for more than a predetermined period of time. For example if the printer runs out of paper or ink it may go off-line. If the supplies are replenished within a few minutes the user would usually desire any pending print jobs to print automatically. However, if the printer has been off-line for a few days the user may prefer to see a summary of pending print jobs before any of those print jobs are printed. Again this period may be set by the administrator on a global basis or on an individual user or class of user basis. The user may be allowed to set a different period.

In some circumstances there may be print jobs which must be printed, irrespective of the end user's desires, such as a bill from a service provider. Accordingly, there is an option for the creator of a print job to specify an "force print"flag such that the document is automatically printed as soon as the printer is set to its "normal" mode. Alternatively the print job may be printed whilst the printer is in its "vacation" mode, with the "force print" flag temporarily overriding the "vacation" mode status.

In the preferred embodiment the server to which the printer sends its "vacation"and "normal" mode signals may be different from the one or more servers from which print jobs originate, since in the netpage system printer specific mode information is typically recorded by one or more registration servers in a form which may be queried by other servers. Furthermore, the one or more servers from which print jobs originate may be different from the one or more servers from which the pending print jobs or the summary of pending print jobs ultimately emerge, since in the netpage system page servers provide persistent storage of print jobs and may do so even when the target printer is not receptive The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

We claim:

1. A method of configuring a printer for vacation periods, said printer including a sensor for sensing coded data, said printer being connected to a network server, said method comprising switching the printer between:
    a first operative mode, in which the network server transmits print data to the printer and the printer prints documents; and
    a second operative mode, in which the printer does not print documents and the network server stores data relating to pending print jobs which have not been printed,
    wherein when the mode changes from the second mode to the first mode the network server retrieves or generates an electronic summary of the pending print jobs and causes the printer to print a printed summary corresponding to the electronic summary, said printed summary including coded data readable by the sensor, said coded data being indicative of a print selection and a delete selection for each entry.

2. The method of claim 1, wherein a print job selected on the printed summary for printing is printed, or a print job selected on the printed summary for deletion is deleted from the electronic summary.

3. The method of claim 2, wherein the a print job selected on the printed summary for printing is deleted from the electronic summary after printing.

4. The method of claim 1, wherein each entry in the electronic summary is retained for a selected period of time after entering the first mode from the second mode unless the respective entry is deleted beforehand and at the end of the selected period any entries in the electronic summary are deleted.

5. The method of claim 1, wherein in the second mode the server stores the data relating to the print jobs and on changing from the second to the first mode the server generates the electronic summary and forwards a print job corresponding to the electronic summary to the printer.

6. The method of claim 1, wherein in the second mode the server transmits print data to the printer and the printer receives and stores the print data and on changing from the second to the first mode the printer generates the electronic and printed summaries.

7. The method of claim 1, wherein the printer further includes a user interface for changing the operative mode of the system between the first and second modes or vice versa.

* * * * *